United States Patent Office 3,467,848
Patented Sept. 16, 1969

3,467,848
STATIC CONVERTOR CONTROL SYSTEMS IN WHICH MAXIMUM NEGATIVE RATE-OF-CHANGE OF FIRING ANGLE IS LIMITED
John Desmond Ainsworth, Stafford, England, assignor to The English Electric Company, London, England, a British company
Filed June 5, 1967, Ser. No. 643,673
Claims priority, application Great Britain, June 3, 1966, 24,746/66
Int. Cl. H02m 1/18
U.S. Cl. 321—14                              9 Claims

ABSTRACT OF THE DISCLOSURE

A control system for a high power convertor employed in H.V.D.C. schemes and designed to vary the angle $\alpha$ of the firing pulses to the convertor so as to govern the output to the desired level, a rate-limiting circuit being included to limit the maximum rate at which $\alpha$ can reduce to zero which could otherwise cause voltage "overshoot" in response to sudden changes in operating conditions.

---

This invention relates to control systems for static convertors; that is, electrical apparatus for effecting conversion between A.C. and D.C.

From one aspect, the present invention consists in a system for controlling the application of firing pulses to a controlled device in a static convertor for effecting conversion of electrical energy between A.C. and D.C. systems, comprising a monitoring circuit for monitoring a quantity possessed by either of the systems and deriving therefrom a signal proportional to this quantity, a comparison circuit for comparing said signal with a reference signal, and control means for varying the firing angle $\alpha$ of said pulses in dependence on the difference between these signals in such a sense as to reduce the difference towards zero, the control means including a rate-limiting circuit for limiting to a predetermined value the maximum rate at which the firing angle can reduce towards zero, whereby to control the resulting increase in the D.C. output voltage from said convertor and reduce the tendency for said voltage to overshoot in response to sudden changes in the operating conditions.

The firing angle $\alpha$ is defined as the amount, in electrical degrees, by which the instant of firing any particular controlled device, e.g. a mercury pool valve or a thyristor, is delayed following the instant of natural commutation of the valve, that is, the instant at which its anode potential rises above its cathode potential.

This restriction on the rate-of-change of firing angle is only imposed when this change is occurring in the negative sense, a change in the positive sense (increasing $\alpha$) being unrestricted, or at least it is not restricted to a value less than that corresponding to a rate of change of firing angle of 360° electrical per cycle of the control frequency.

This invention is of particular utility under normal starting conditions and during sudden power reversal in high voltage direct current transmission systems where there is a tendency for the line voltage to overshoot by reason of the distributed inductance and capacitance possessed by the line. In particular, the power lines must be insulated to withstand this voltage, which may be twice the steady-state value, and in some complex systems even more, and thus by employing a system according to this invention the amount of insulation required is not so great.

In order that the invention can be fully understood, some embodiments thereof will now be described, by way of example, with reference to the accompanying drawings, in which.

Figure 2:
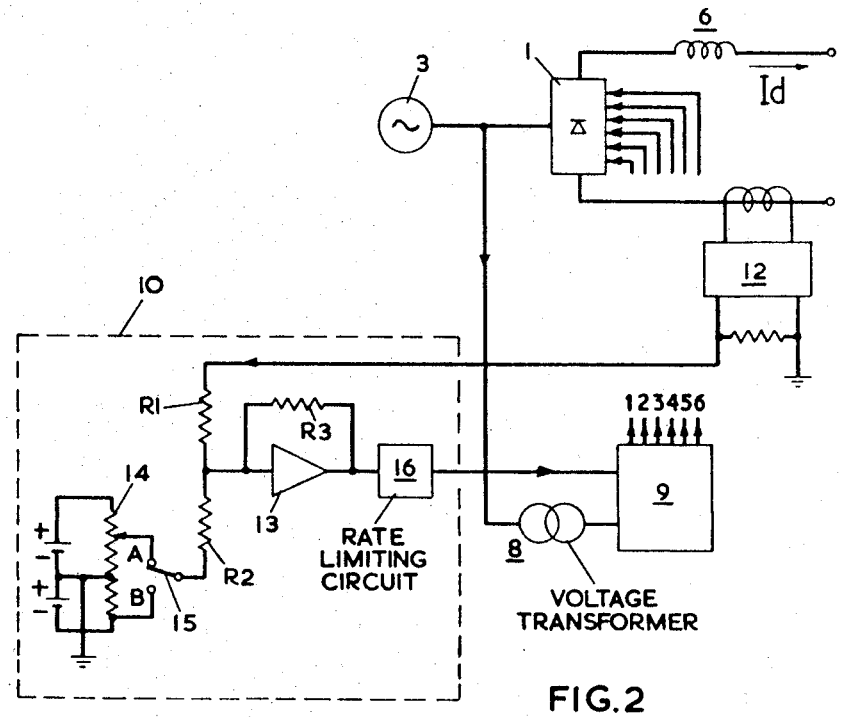
FIG. 2 shows a block diagram of a system according to this invention.
Figure 5:
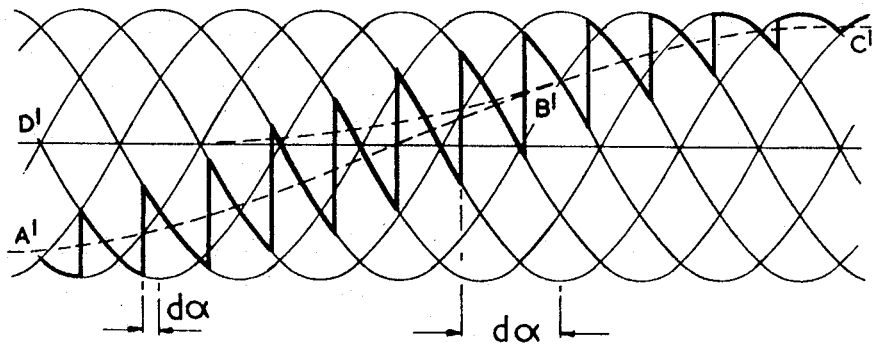
Figure 6:
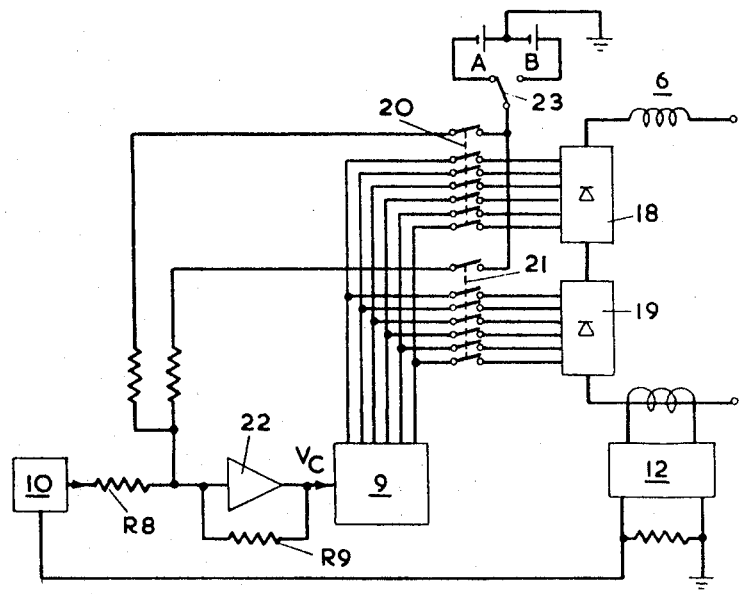
Figure 7:
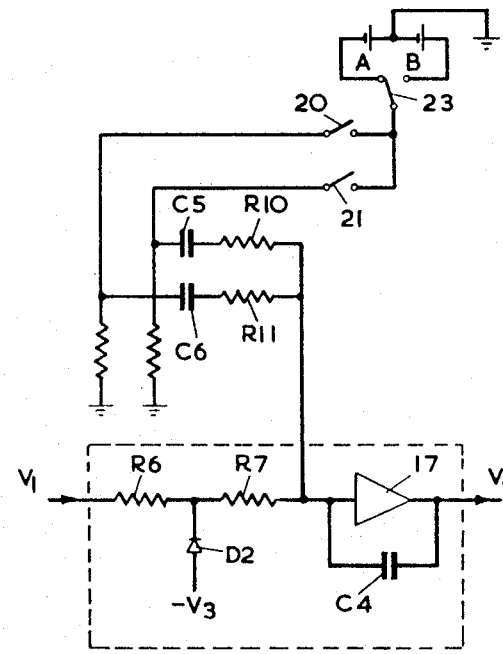

FIG. 5 graphically illustrates the effect of the rate-limiting circuits on the output voltage; and FIGS. 6 and 7 show modifications which may be made to the FIG. 2 system where a single grid control circuit is selectively connected to different groups of convertor valves which may be individually "blocked" and "deblocked."

Figure 1:
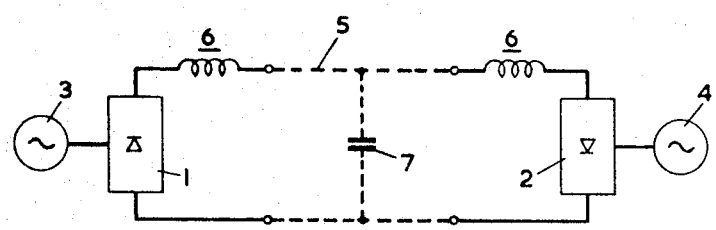
FIG. 1 shows an equivalent circuit of a high voltage direct current transmission link.

Referring now to FIG. 1, there is shown an equivalent circuit of a typical high voltage direct current transmission link comprising two convertors 1 and 2, the convertor 1 being supplied from an A.C. system 3 and operating as a rectifier and the convertor 2 being operated as an invertor and supplying an A.C. system 4. The convertors are each connected to a D.C. line 5 through smoothing reactors 6.

In the case of a single D.C. cable, the line may be represented by its capacitance, this being indicated by a capacitor 7 in the figure, and this capacitor, together with the reactors 6, form an oscillatory circuit with rather small inherent damping.

Thus, the occasion can arise that, should the convertor (invertor) 2 go open-circuit due to a fault, and the convertor (rectifier) 1 be switched-on at zero firing angle ($\alpha=0$), as will normally be the case with a simple negative feedback control system, then the voltage across the rectifier will rise to a value approximately equal to its maximum value V (V being proportional to $\cos \alpha$) and the D.C. line voltage will initially be offset and overshoot to a value up to 2V before dying away in an oscillatory manner to the value V. Smaller values of overshoot may be realised if the invertor is permitted to conduct to some degree.

As mentioned above, this voltage overshoot can be damaging to the insulation and the effect is particularly acute where D.C. cables are concerned since they cannot be economically designed to withstand such surges.

In accordance with this invention a control system is provided which includes in a stage which governs the firing angle of the convertor valves a circuit which limits the maximum possible rate of change of its output voltage to a predetermined value when this change is in a sense tending to decrease the firing angle. Thus, the firing angle cannot be immediately reduced to zero upon switch-on despite the tendency for the convertor D.C. voltage to increase rapidly whereas with values of this voltage within the normal range there is no such restriction placed on the adjustment of the firing angle.

FIG. 2 shows the system, and it includes a voltage transformer 8 supplying a grid control circuit 9 for the convertor valves; this control circuit may conveniently be of the type described in either of our co-pending U.S. patent applications Nos. 636,396 and 636,398. The phase of the grid pulses for the valves is controlled by a circuit 10 in relation to the phase of the A.C. system 3, the firing angle delay being dependent on the output voltage from this circuit 10.

More particularly, a D.C. current transformer 12 monitors the line current and the output signal is applied to the input of an operational amplifier 13, through a resistor R1, together with a current reference signal applied through a resistor R2. This reference signal is derived as a voltage developed across a potentiometer 14, the polarity being dependent on the position (A or B) occupied by a switch 15. The input to the operational amplifier is accordingly constituted by the voltage difference between the signals applied through R1 and R2.

In turn, the output of the operational amplifier 13 is applied to a rate-limiting circuit 16 the output of which is applied to the grid control circuit 9.

The rate-limiting circuit 16 is designed such that the maximum possible rate of change of its output voltage in a sense such as to decrease the firing angle $\alpha$ is restricted to a predetermined value, whereas in the opposite sense its rate of change of voltage is not restricted, or at least is not restricted to a value less than that corresponding to a rate of change of firing angle of 360° electrical per cycle of the A.C. supply. This latter limitation is for the purpose of ensuring that, should a short-circuit occur on the D.C. line, the control system will not be prevented from increasing the firing angle at the maximum theoretical rate of 360° per cycle to reduce transient overcurrents.

Figure 3:
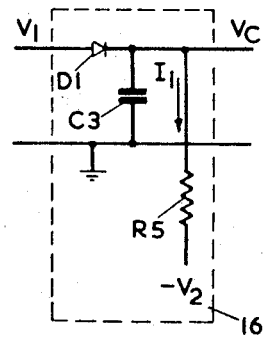
FIGS. 3 and 4 show two different forms of rate-limiting circuits.
Figure 4:
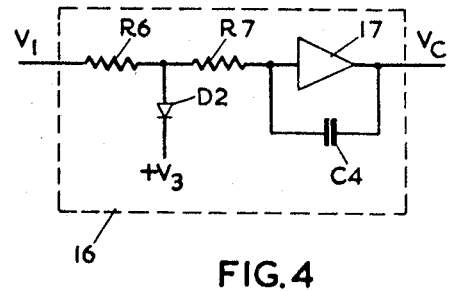

Two forms of rate-limiting circuit are shown in FIGS. 3 and 4. It will be assumed that the firing angle $\alpha$ produced by the circuit 9 is linearly proportional to its control voltage input $V_c$ from circuit 10, i.e., $\alpha = KV_c$ degrees, where K is a constant. Circuit 9 could however equally well have a different characteristic, provided $\alpha$ is at least progressively controlled by $V_c$, e.g., cos $\alpha$ proportional to $V_c$ over $\alpha = 0-180°$.

In FIG. 3, the rate-limiting circuit comprises a diode D1 connected in series with the input-output path and a capacitor C3 connected across the output circuit, a resistor R5 being connected to a source of negative voltage $V_2$. In this embodiment, the voltage $V_2$ and the ohmic value of the resistor R5 are sufficiently high to ensure that the current $I_1$ is substantially constant for the normal range of $V_c$. Thus, for input voltages $V_1$ having a negative rate of change of less than $I_1/C3$ volts per second the output voltage $V_c$ will accurately follow the input voltage, the voltage drop in the diode D1 being neglected. However, for higher negative rates of change the output rate is restricted to this value $I_1/C3$ and hence $d\alpha/dt$ is restricted to $KI_1/C3$ degrees per second.

For a positive rate of change there is substantially no restriction imposed provided that the output impedance of the operational amplifier 13 is sufficiently low.

In FIG. 4, the rate-limiting circuit includes two resistors R6 and R7, a diode D2 connected to a source of positive voltage $V_3$, and an integrator comprising a high gain amplifier 17 with a parallel-connected capacitor C4. With this circuit the control system has zero steady-state error. In particular, for a positive input voltage $V_1$ up to $V_3(R6+R7)/R7$, and for a negative input, the output $V_c$ follows the input with the Laplace function, $$V_c = -V_1/(R6+R7)pC4$$

and for larger positive values of $V_1$ the diode D2 conducts to the voltage $V_3$ and the output is rate-limited to a value of $-V_3/C4R7$ volts/sec. Hence, the firing angle rate $d\alpha/dt$ is limited to a negative value not exceeding $KV_3/C4R7$ degrees/sec.

In describing the operation of the system upon starting-up, it will be assumed that the firing angle for the convertor 2 is restricted in this instance to values in excess of 90° so that it is operative only as an invertor, and cannot rectify.

Before starting-up, the switch 15 in the circuit 10 associated with the convertor 1 is held in position B, that is, to a negative potential source, so that the amplifier 13 is saturated in a sense such as to give the maximum possible value of $V_c$, and hence the maximum possible firing angle in full inversion. Accordingly, since both convertors 1 and 2 are trying to function as invertors there can be no steady-state current, and leakage currents will result in zero D.C. line voltage.

In order to start, the switch 15 is turned to position A and, in the absence of the rate-limiting circuit 16, the firing angle would jump to zero ($\alpha = 0$) and the rectified output voltage would immediately rise in the manner discussed. However, the effect of the introduction of this rate-limiting circuit is to cause only a slow rise in the rectifier output voltage. This effect is shown more clearly in FIG. 5 where $d\alpha/dt$ is $-75°$ per cycle, the rectifier E.M.F. following the curve A', B', C'; the actual terminal voltage of the rectifier corresponds only to the positive values of this E.M.F., and follows the curve D', B', C'. Thus, as the rectifier voltage approaches its full positive value, the invertor current rises and the system eventually settles down to a current substantially proportional to that set by the potentiometer 14 as the error signal between this setting and the feedback from the transformer 12 reduces to zero.

By restricting the rate of change $d\alpha/dt$ the slope of the curve D', B', C' may be made as low as desired, and with normal values of line inductance and capacitance it is possible to find a critical value of $d\alpha/dt$ at which the D.C. line voltage overshoot is zero. In some instances however, it may be desirable to permit a slight overshoot, e.g., 10% of the D.C. line voltage, in order to obtain a faster build-up of power transmission. On the other hand, with lines having a high value of capacitance (C) and in which the current setting ($Id$) is low, the arrangement can be such that only the initial part of the convertor and D.C. line voltage is rate-limited, the remaining part of the rise occurring at a lower rate of $Id/C$ volts/sec., which is lower than that permitted by the circuit 16, and therefore there will be no overshoot.

In switching-off the system the switch 15 is returned to position B whereupon all currents are rapidly reduced to zero, but if a slower turn-off is required, to reduce the shock to the A.C. system, the current may firse be gradually reduced to zero by adjustment of the potentiometer 14.

Provision may also be made for reversing the direction of power flow by restricting the value of firing angle for convertor 1 to values in excess of 90° so that it is permitted to operate only as an invertor, and by removing this restriction from the convertor 2 and adding a control system thereto of the type just described for convertor 1.

The system may also be extended in order to prevent line voltage overshoot upon one or two or more series-connected bridge convertor sets being de-blocked, i.e. the condition obtaining upon the re-application of grid pulses to valves in that convertor set which have previously been biassed-off (blocked).

The operation of the system in this mode is described with reference to FIG. 6 in which two convertor bridges 18, 19 are connected in series, each being bridged by a by-pass valve (not shown) when either one of grid-pulse isolating switches 20, 21 is opened, to maintain the D.C. circuit. An amplifier 22 is connected between the circuit 10 and the grid control circuit 9, this amplifier having an input resistor R8 and a feedback resistor R9 of equal values so that the effective gain of this amplifier is unity. A phase reversal is therefore introduced which requires correction by reversal of the feedback from the current transformer 12 and a reversal of D1 and V₂ (FIG. 3) or D2 and V₃ (FIG. 4). Positive or negative D.C. signals are added to the input of this amplifier through a switch 23 in dependence on whether the convertors are operating as rectifiers (position A') or invertors (position B'), these signals being applied upon closure of switches 20 or 21.

Thus, the action of de-blocking a convertor set, which is effected by the closure of the appropriate one of these latter switches, adds a d.c. signal to the amplifier 22 and thereby produces a step change in the firing angle α which either increases or decreases from its former value in dependence on the polarity of this signal. Thus, by arranging the magnitude of this step change to be such as to cause the D.C. line voltage to be at the same value before and after blocking there will be no disturbance on the line.

When the control loop includes an integrator, as in FIG. 4, an alternative circuit for de-blocking may be employed as shown in FIG. 7. In this arrangement, the switches 20 and 21 are arranged to deliver a pulse of predetermined voltage-time area directly to the input of the integrator through a resistor-capacitor nework R10, C5 and R11, C6. The value of the capacitors are chosen so as to produce the desired net D.C. change in V_c, and the resistors R10, R11 are necessary to prevent the amplifier from being swamped with a current pulse greater than that which it can accept.

Although the controlled quantity in the examples described is direct current, it is to be understood that this quantity could alernatively be some other parameter, e.g. D.C. power, or the frequency of the A.C. system.

I claim:
1. A system for controlling the application of firing pulses to a controlled device in a static convertor for effecting conversion of electrical energy between A.C. and D.C. systems, comprising
  a monitoring circuit for monitoring a quantity possessed by either of the systems and deriving therefrom a signal proportional to this quantity,
  a reference source,
  a comparison circuit for comparing said signal with a reference signal from said source, and
  control means for varying the firing angle α of said pulses in dependence on the difference between these signals in such a sense as to reduce the difference towards zero, the control means being operative to maintain the maximum rate at which the firing angle can increase to a value not less than 360° electrical per cycle of the A.C. system frequency, and including
  a rate-limiting circuit for limiting to a predetermined value the maximum rate at which the firing angle can decrease towards zero whereby to control the resulting increase in the D.C. output voltage from said convertor and reduce the tendency for this voltage to overshoot in response to sudden changes in the operating conditions.

2. A system for controlling the application of firing pulses to a controlled device in a static convertor for effecting conversion of electrical energy between A.C. and D.C. systems, comprising
  a monitoring circuit for monitoring a quantity possessed by either of the systems and deriving therefrom a signal proportional to this quantity,
  a reference source,
  a comparison circuit for comparing said signal with a reference signal from said source, and
  control means for varying the firing angle α of said pulses in dependence on the difference between these signals in such a sense as to reduce the difference towards zero, the control means including
  a rate-limiting circuit for limiting to a predetermined value the maximum rate at which the firing angle can reduce towards zero whereby to control the resulting increase in the D.C. output voltage from said convertor and reduce the tendency for this voltage to overshoot in response to sudden changes in the operating conditions, said rate-limiting circuit comprising
    a diode connected in series with its input and both
    a capacitor and
    a constant source of direct current connected in shunt at its output.

3. A system according to claim 1, wherein the rate-limiting circuit comprises
  a diode connected in series with its input and both
  a capacitor and
  a constant source of direct current connected in shunt at its output.

4. A system according to claim 1, wherein the rate-limiting circuit comprises
  an integrator, said integrator having
  a reference voltage source connected at its input whereby to limit the magnitude of the input voltage to a predetermined level.

5. A system according to claim 2, for controlling the application of firing pulses to controlled devices in a static convertor including
  at least two convertor sets connected together in series, the said control means including
  a switching circuit operative in response to any one of the convertor sets being de-blocked to add to the output from the rate-limiting circuit a D.C. voltage of such polarity and magnitude as to reduce the tendency for the output voltage to overshoot in response to this sudden change in the operating conditions.

6. A system according to claim 1, wherein the said quantity monitored is possessed by the D.C. system.

7. A system according to claim 1, wherein the said quantity monitored is possessed by the A.C. system.

8. A system for controlling the application of firing pulses to a controlled device in a static convertor including at least two convertor sets connected together in series for effecting conversion of electrical energy between A.C. and D.C. systems, comprising
  a monitoring circuit for monitoring a quantity possessed by either of the systems and deriving therefrom a signal proportional to this quantity,
  a reference source,
  a comparison circuit for comparing said signal with a reference signal from said source and
  control means for varying the firing angle α of said pulses in dependence on the difference between these signals in such a sense as to reduce the difference towards zero, the control means including
    (a) a rate-limiting circuit for limiting to a predetermined value the maximum rate at which the firing angle can reduce towards zero whereby to control the resulting increase in the D.C. output voltage from said convertor and reduce the tendency for this voltage to overshoot in response to sudden changes in the operating conditions, said rate-limiting circuit comprising
      an integrator, said integrator having
        a reference voltage source connected at its input whereby to limit the magnitude of the input voltage to a predetermined level, and
    (b) an integrating network operative in response to any one of the convertor sets being de-blocked to add to the input to the said integrator in the rate-limiting circuit a pulse having such a voltage-time area as to reduce the tendency for the output voltage to overshoot in response to this sudden change in the operating conditions.

9. A system for controlling the application of firing pulses to a controlled device in a static convertor for effecting conversion of electrical energy between A.C. and D.C. systems, comprising a D.C. current transformer for monitoring the D.C. current in said D.C. system and deriving therefrom a voltage signal proportional to this quantity a reference voltage source comparison circuit for comparing the voltage signal with a refernce voltage from said source and control means for varying the firing angle $\alpha$ of said pulses in dependence on the difference between these voltages in such a sense as to reduce the difference towards zero, the control means being operative to maintain the maximum rate at which the firing angle can increase to a value not less than 360° electrical per cycle of the A.C. system frequency, and including a rate-limiting circuit for limiting to a predetermined value the maximum rate at which the firing angle can reduce towards zero.

References Cited

UNITED STATES PATENTS

| | | | |
|---|---|---|---|
| 2,866,148 | 12/1958 | Forssell | 321—2 |
| 3,275,838 | 9/1966 | Almstrom | 321—2 X |
| 3,335,353 | 8/1967 | McVey et al. | 321—5 |
| 3,339,083 | 8/1967 | Uhlman | 321—2 X |

JOHN F. COUCH, Primary Examiner

W. H. BEHA, JR., Assistant Examiner

U.S. Cl. X.R.

321—16, 27, 38